United States Patent
Wiles et al.

(10) Patent No.: US 8,266,605 B2
(45) Date of Patent: Sep. 11, 2012

(54) METHOD AND SYSTEM FOR OPTIMIZING PERFORMANCE BASED ON CACHE ANALYSIS

(75) Inventors: Roger Wiles, Corinth, TX (US); Maarten Koning, Ontario (CA)

(73) Assignee: Wind River Systems, Inc., Alameda, CA (US)

( * ) Notice: Subject to any disclaimer, the term of this patent is extended or adjusted under 35 U.S.C. 154(b) by 1636 days.

(21) Appl. No.: 11/359,706

(22) Filed: Feb. 22, 2006

(65) Prior Publication Data

US 2007/0240117 A1 Oct. 11, 2007

(51) Int. Cl.
*G06F 9/45* (2006.01)
(52) U.S. Cl. ........ 717/151; 717/141; 717/145; 717/152; 717/153; 717/154; 717/159; 717/166
(58) Field of Classification Search ................. 717/151, 717/156, 158–162, 141, 145, 152–154, 166
See application file for complete search history.

(56) References Cited

U.S. PATENT DOCUMENTS

| | | | | |
|---|---|---|---|---|
| 5,212,794 A * | 5/1993 | Pettis et al. | ................... | 717/153 |
| 5,303,377 A * | 4/1994 | Gupta et al. | ................... | 717/155 |
| 5,530,964 A * | 6/1996 | Alpert et al. | ................... | 717/158 |
| 6,282,707 B1 * | 8/2001 | Isozaki | .......................... | 717/157 |
| 6,295,608 B1 * | 9/2001 | Parkes et al. | ...................... | 714/1 |
| 6,301,652 B1 * | 10/2001 | Prosser et al. | ................. | 712/204 |
| 6,381,739 B1 * | 4/2002 | Breternitz et al. | ............. | 714/37 |
| 6,463,582 B1 * | 10/2002 | Lethin et al. | ................... | 717/158 |
| 6,516,462 B1 * | 2/2003 | Okunev et al. | ................ | 717/154 |
| 6,631,518 B1 * | 10/2003 | Bortnikov et al. | ............ | 717/158 |
| 6,742,179 B2 * | 5/2004 | Megiddo et al. | ............... | 717/130 |
| 6,751,705 B1 * | 6/2004 | Solomon et al. | ............... | 711/122 |
| 7,080,366 B2 * | 7/2006 | Kramskoy et al. | ............. | 717/148 |
| 7,107,585 B2 * | 9/2006 | Berent et al. | ................... | 717/154 |
| 7,143,404 B2 * | 11/2006 | Haghighat et al. | ............ | 717/159 |
| 7,246,220 B1 * | 7/2007 | Cheng et al. | ................... | 712/228 |
| 7,356,813 B2 * | 4/2008 | Liu et al. | ........................ | 717/163 |
| 2003/0023663 A1 * | 1/2003 | Thompson et al. | ........... | 709/108 |
| 2004/0128661 A1 * | 7/2004 | Ghosh et al. | ................... | 717/159 |
| 2005/0086653 A1 * | 4/2005 | Heishi et al. | ................... | 717/151 |
| 2005/0144420 A1 * | 6/2005 | Michimoto et al. | .......... | 711/203 |
| 2005/0155026 A1 * | 7/2005 | DeWitt et al. | ................. | 717/158 |
| 2005/0246697 A1 * | 11/2005 | Hsieh et al. | .................... | 717/151 |
| 2005/0246700 A1 * | 11/2005 | Archambault et al. | ........ | 717/156 |
| 2006/0129997 A1 * | 6/2006 | Stichnoth et al. | ............. | 717/127 |
| 2006/0242636 A1 * | 10/2006 | Chilimbi et al. | ............... | 717/158 |
| 2007/0022274 A1 * | 1/2007 | Rosner et al. | ................... | 712/220 |
| 2007/0150881 A1 * | 6/2007 | Khawand et al. | ............. | 717/162 |
| 2008/0244239 A1 * | 10/2008 | DeWitt et al. | ................. | 712/220 |

OTHER PUBLICATIONS

McIntosh et al., "Whole-Program Optimization of Global Variable Layout", 2006.*
Rubin et al., "An Efficient Profile-Analysis Framework for Data-Layout Optimizations", 2002.*

* cited by examiner

*Primary Examiner* — Phillip H Nguyen
(74) *Attorney, Agent, or Firm* — Fay Kaplun & Marcin, LLP

(57) ABSTRACT

Described is a method and system for optimizing a code layout for execution on a processor including internal and/or external cache memory. The method and system includes executing a program having a first layout, generating at least one memory access parameter for the program, the memory access parameter being based on a cache memory of a computing system on which the program is designed to run and constructing a second layout for the program as a function of the at least one memory access parameter.

19 Claims, 3 Drawing Sheets

METHOD AND SYSTEM FOR OPTIMIZING PERFORMANCE BASED ON CACHE ANALYSIS

BACKGROUND

A cache memory is a high-speed storage mechanism that stores copies of data and/or instructions from a main memory. When a central processing unit (CPU) intends to read/write data from/into a location in the main memory, it first determines whether the location is in the cache memory, because the cache memory provides faster access to the data therein. For example, if the CPU is executing a read request, the CPU will check the cache memory to see if the data is in the cache memory. If the data is located in the cache memory ("a cache hit"), the CPU immediately reads the data from the cache memory. However, if the data is not in the cache memory ("a cache miss"), the data needs to be copied from the main memory to a location in the cache memory. This copying of data from the main memory to the cache memory is termed a "cache fill," i.e., data is filled into the cache memory from the main memory. The cache fill operation may fill an empty location (referred to as a "cache line") in the cache memory if any cache lines are available. However, if there are no empty cache lines, then an existing cache line needs to be replaced with the new data from main memory. In this manner, the data will be readily accessible when the location is subsequently referenced. However, the cache miss incurs a delay in retrieval/write time, because the cache fill operation needs to be performed, thereby making access to data and/or instructions in the main memory slower than access to data and/or instructions that are already stored in the cache memory.

Ideally, when the CPU executes a program, it will attempt to store the entire program in the cache memory. However, this is impractical, because the cache memory is limited in size and usually smaller than the program. Thus, the program is stored in the larger random access memory (RAM) or virtual memory. As a result, data and instruction sections of the program map to similar cache lines. This causes cache collisions. For example, when a memory location is referenced in the program, the CPU first attempts to find it in the cache memory. However, the cache memory may not contain the location (i.e., a cache miss), so another line must be purged from the cache memory to make room for a new cache line which includes the missing data. Cache collisions and cache misses prevent the CPU from realizing a full performance potential of the cache memory. While most program optimization strategies deal with a replacement policy utilized by the cache memory (i.e., determining which cache line is purged to make room for the new cache line), there has not been any attempt to manipulate data or instruction memory to reduce cache misses or cache collisions in the cache memory.

SUMMARY OF THE INVENTION

A method for executing a program having a first layout, generating at least one memory access parameter for the program, the memory access parameter being based on a cache memory of a computing system on which the program is designed to run and constructing a second layout for the program as a function of the at least one memory access parameter.

A system having a simulator to execute a program having a first layout, the simulator generating at least one memory access parameter for the program, the memory access parameter being based on a cache memory of a computing system on which the program is designed to run and a linker to construct a second layout for the program as a function of the at least one memory access parameter.

A system including a memory to store a set of instructions and a processor to execute the set of instructions. The set of instructions being operable to execute a program having a first layout, generate at least one memory access parameter for the program, the memory access parameter being based on a cache memory of a computing system on which the program is designed to run and construct a second layout for the program as a function of the at least one memory access parameter.

DETAILED DESCRIPTION

Figure 1:
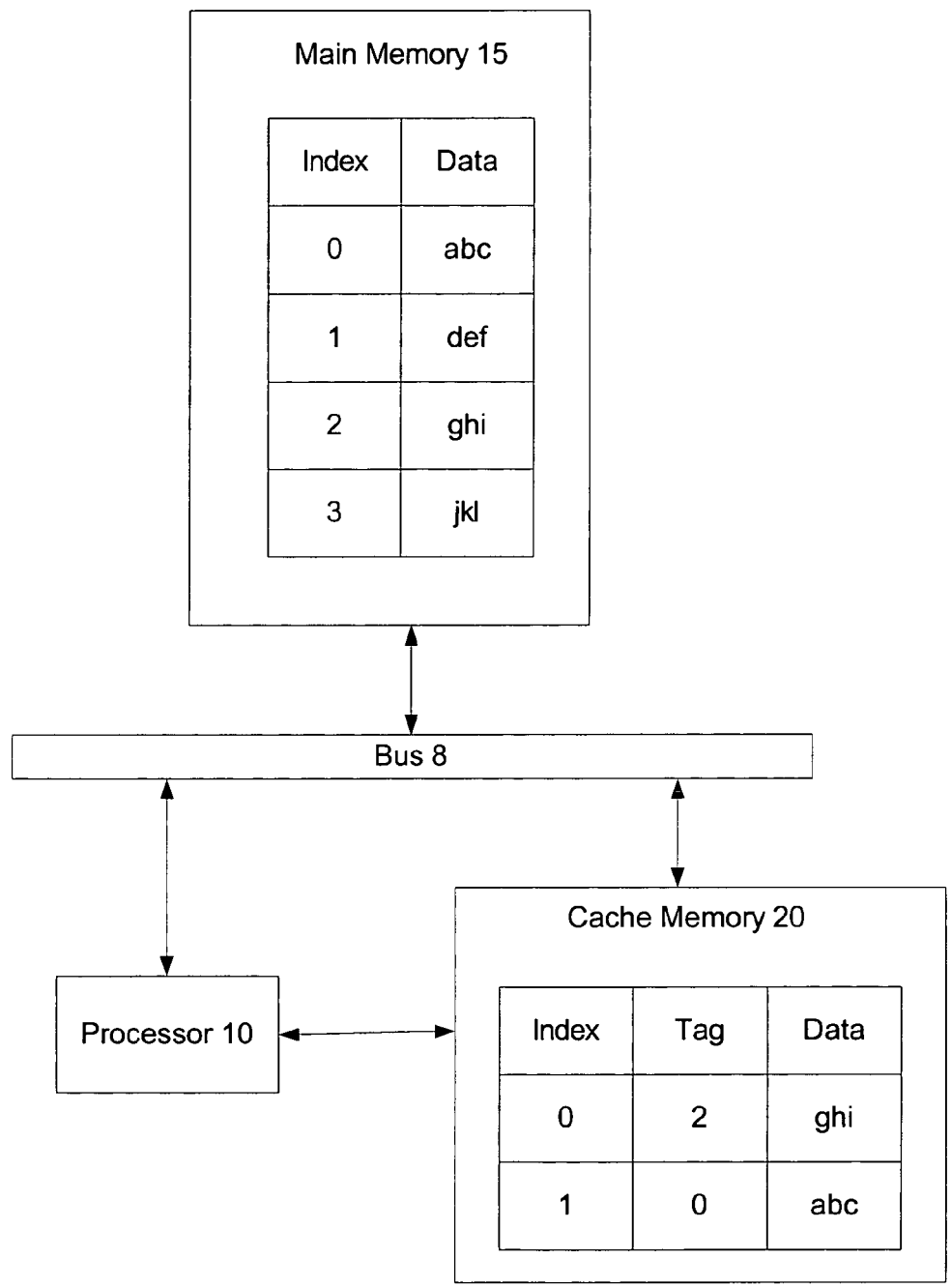
FIG. 1 shows an exemplary embodiment of a memory arrangement according to the present invention.

The present invention may be further understood with reference to the following description and the appended drawings, wherein like elements are referred to with the same reference numerals. The exemplary embodiments of the present invention describe a method and system for optimizing code performance based on cache analysis. Cache access data is generated for a program that may be compiled and executed on an external system. Execution paths of the program may be identified by a programmer or by data gathered by the external execution of the program. When the program is being recompiled, the cache access data along with the execution path data is utilized by a linker to rearrange a code layout, optimizing its performance, e.g., reducing contention for cache lines, reducing cache collisions, reducing cache misses, etc.

The present invention is described with reference to accessing data from the cache memory of a computing system. Those skilled in the art will understand that the data being referred to in this description is program data and/or program instructions. Program data is normally read/write data and may be, for example, a value for a variable that the program uses to execute. Program instructions are the code of the program that the CPU actually executes and is normally read only. In some processors, the cache memory may be split into a data cache and an instruction cache to store the different types of data. In the exemplary embodiment described herein, the cache memory is considered to be one cache memory, but this example should not be considered to be limiting as the methods for optimizing performance in accordance with the exemplary embodiments of the present invention may be used in any cache memory without reference to how the cache memory may be split. In addition, other types of data may also be stored in the cache memory in an optimized manner as described herein.

FIG. 1 shows an exemplary embodiment of a computing environment including a processor 10, a cache memory 20 and a main memory 15. The processor 10 and the cache memory 20 access the main memory 15 via a bus 8, which may be coupled to various other components (e.g., I/O devices) within the computing environment. In the exemplary embodiment, the main memory 15 includes a random access memory (RAM). A size of the cache memory 20 may be varied depending on the computing environment and applications executed thereby.

As is known in the art, the cache memory 20 may be referred to as an internal cache or Level 1 (L1) cache if it is built into the architecture of the processor 10. If the cache memory 20 is disposed between the processor 10 and the main memory 15, it is typically referred to as an external cache or Level 2 (L2) cache. The L2 cache is generally larger than the L1 cache, and the main memory 15 is generally larger than the L2 cache. Again, the present invention is not limited to any type of cache memory, but may be implemented in a computing device having any type of cache, e.g., L1 cache, L2 cache, etc. Those skilled in the art understand that a speed at which resident data in a particular memory is accessed is inversely proportional to its size, i.e., L1 cache is the fastest and the main memory 15 is the slowest. As such, to achieve optimal speed, the processor 10 desires to use the cache memory 20 for as many operations as possible without intervention by the main memory 15, e.g., no cache fills during processing.

As shown in FIG. 1, the main memory 15 includes a data structure which hosts data and a unique index associated therewith. The index defines a location of the data in the main memory 15 and is typically referred to as the "address" of the data. For example, the address of the data 'abc' is the index 0. The cache memory 20 includes copies of frequently accessed data from the main memory 10. That is, data which is repeatedly read by the processor 10 is copied into the cache memory 20 so that it is returned quicker when requested by the processor 10, as explained above. For example, the data 'abc' has a cache index 1 and a tag 0. The cache index refers to the location of the data in the cache memory 20, and the tag refers to the location of the data in the main memory 15. Thus, as shown in FIG. 1, the value of the tag for the data 'abc' in the cache memory 20 (i.e., 0) is equivalent to the value for the index of the data 'abc' in the main memory 15.

Conventionally, when the processor 10 intends to access a location (and the corresponding data) in the main memory 15, it first determines whether there is a copy of the location in the cache memory 20 by comparing the address/index of the location to all of the tags in the cache memory 20. If the processor 10 identifies the address in the cache memory 20, it is referred to as a cache hit, while an absence of the address is referred to as a cache miss. In the case of the cache hit, the processor 10 immediately reads/writes the data in the cache line. The effectiveness of the cache memory 20 is then measured by, for example, a hit rate, i.e., a percentage of cache accesses that result in a cache hit. In the case of the cache miss, the cache memory 20 allocates a new cache line which comprises the address missed (i.e., the tag) and a copy of the data from the main memory 15. As understood by those skilled in the art, the cache miss incurs a delay in processing time, because a cache fill operation will need to be completed. The cache fill operation requires access to the main memory 15 which is slower than access to the cache memory 20. Additionally, in the case of the cache miss and when the cache memory 20 is at capacity, a cache collision will occur, because the cache fill operation requires that an existing cache line be replaced with a new cache line containing the tag and a copy of the data that was missing. Those skilled in the art will understand that the cache does not have to be full for a cache collision to occur in some CPU designs.

The cache memory 20 will use a replacement policy to decide which existing cache line will be evicted to make room for the new cache line. In one example, the cache memory 20 may use a least recently used (LRU) scheme to replace cache lines. However, other cache replacement algorithms may also be used. For example, a cache algorithm may calculate a given cache line based on the address of the data.

As described above, when the processor 10 is executing a program (e.g., one or more routines, portions of code, etc.), the ideal situation would be to cache fill the entire program in the cache memory 20 as the program was executing so that after an initial fetch of program instructions/data from the main memory 15, the program instructions/data would then be stored in the cache memory 20 allowing faster execution of the program by the processor 10. However, the cache memory 20 is limited in size and is generally smaller than the program. Thus, the entire program cannot be copied to the cache memory 20. Conventionally, the replacement policy (or algorithm) utilized by the cache memory 20 would be manipulated to determine which cache lines should be evicted to make room for data from the program.

In contrast, the exemplary embodiments of the present invention provide a process for analyzing the cache access and execution paths of the program to optimize a code layout of the program. It should be noted that the optimizing process described herein may provide different results for various CPU and cache hardware designs. For example, the exemplary optimizing process may optimize the same program in a different manner for different CPUs and/or cache designs.

Figure 2:
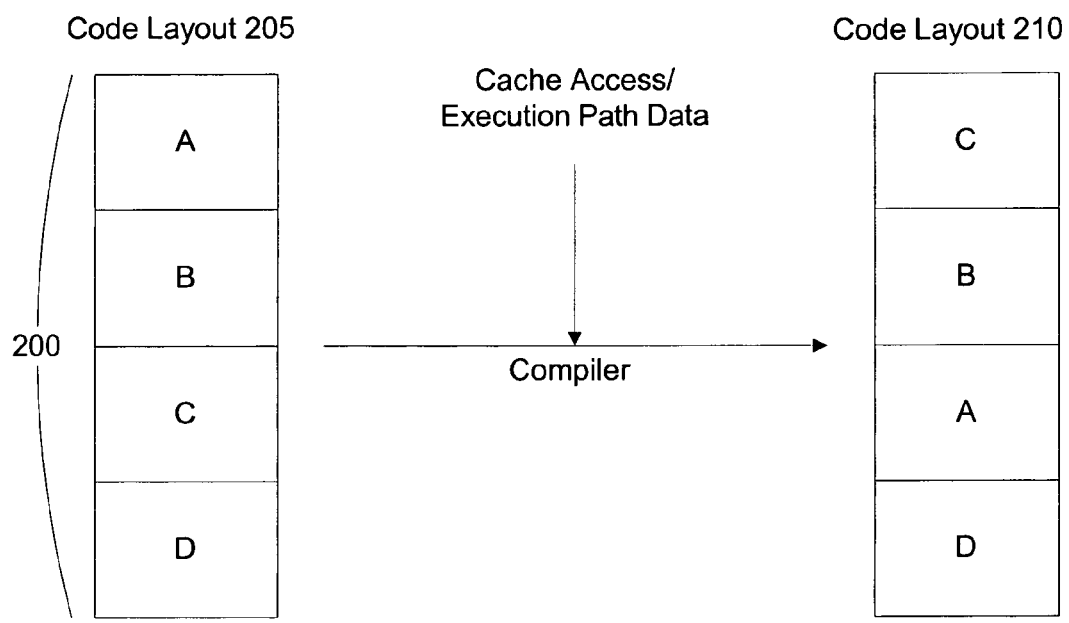
FIG. 2 shows a schematic view of a process for rearranging a program's code layout based on cache access data collected during execution of the program according to the present invention.

FIG. 2 shows a schematic representation of the process for reformatting the program to optimize usage of the cache memory 20. In the exemplary embodiment, a program 200 comprises one or more routines A-D arranged in a first code layout 205. Those skilled in the art will understand that the program 200 may comprise any number of routines, subroutines, constructs and/or any portions of computer code. The first code layout 205 may represent the arrangement of source code of the program 200 as initially coded by a developer.

The program 200 is compiled and run on an external system to generate cache access data and/or execution paths for the program (either type of data may be referred to as a memory access parameter). The cache access data may be any hardware and/or software derived cache line statistical information that may be used to produce a code layout that improves performance and/or reduces contention of cache lines as described herein. The execution path is the order in which a program (or subroutines within the program) will be executed. This execution path data may also be important to optimization because the optimization may not only depend on the number of times that a piece of code is executed, but may also depend on the criticality of a particular path of execution. In some circumstances, the cache access data and the execution path may result in the same optimization, but in other instances they may not. For example, if external memory is very slow and a critical path of execution is not cached (even though this subroutine is used very infrequently), the CPU will wait a significant amount time to complete the cache line fill. To continue with an example, a program may be executing to control an x-ray/gamma ray device. The program may need to respond to an external interrupt request to turn off the device. This may be considered a critical path of execution because if it is not executed as fast as possible, a person being treated by the device may receive more x-rays and/or gamma rays than is required. Thus, while the external interrupt routine may not be one that is executed often, it may be a critical execution path routine that needs to be in cache memory for an optimized program. Accordingly, both factors (cache access data and execution path data) may be used in the exemplary process to determine the optimal code layout for the program.

The external system may be any hardware/software emulator or simulator providing a computing environment for compiling and running the program 200. For example, the external system may be modeled after the computing environment shown in FIG. 1. The cache access/execution path data represents the data described above that may be obtained during execution of the program 200 in the first code layout 205. For example, the cache access data may represent cache hits, misses and/or collisions on a cache-line basis, i.e., a histogram for the cache memory 20 reduced to each cache line. From the cache access data, cache contention may be determined for each portion (e.g., routine) of the program 200. For example, during execution, the routine A and the routine C may intend to fill the same cache line, whereas the routine B may rarely contend for the same cache line. That is, the routine A (e.g., a TCP checksum) may be executed frequently, whereas the routine B may only be executed once (e.g., new TCP session). When the program 200 is recompiled, the cache access data may be used by a linker to generate a second code layout 210 in which, for example, the routine A and the routine B now contend for the same cache line, thereby reducing cache contention and collisions, i.e., the frequently executed routines A and C will no longer contend for the same cache lines. Alternatively, the program 200 may be, for example, a network stack including a transmit-path and a receive-path that may be optimized simultaneously, because they are not in contention (i.e., do not cross). In any case, the exemplary embodiments of the present invention allow more of the program 200 which is routinely accessed (or is critical based on the execution path data) to be placed in the cache memory 20, as will be described further below.

Figure 3:
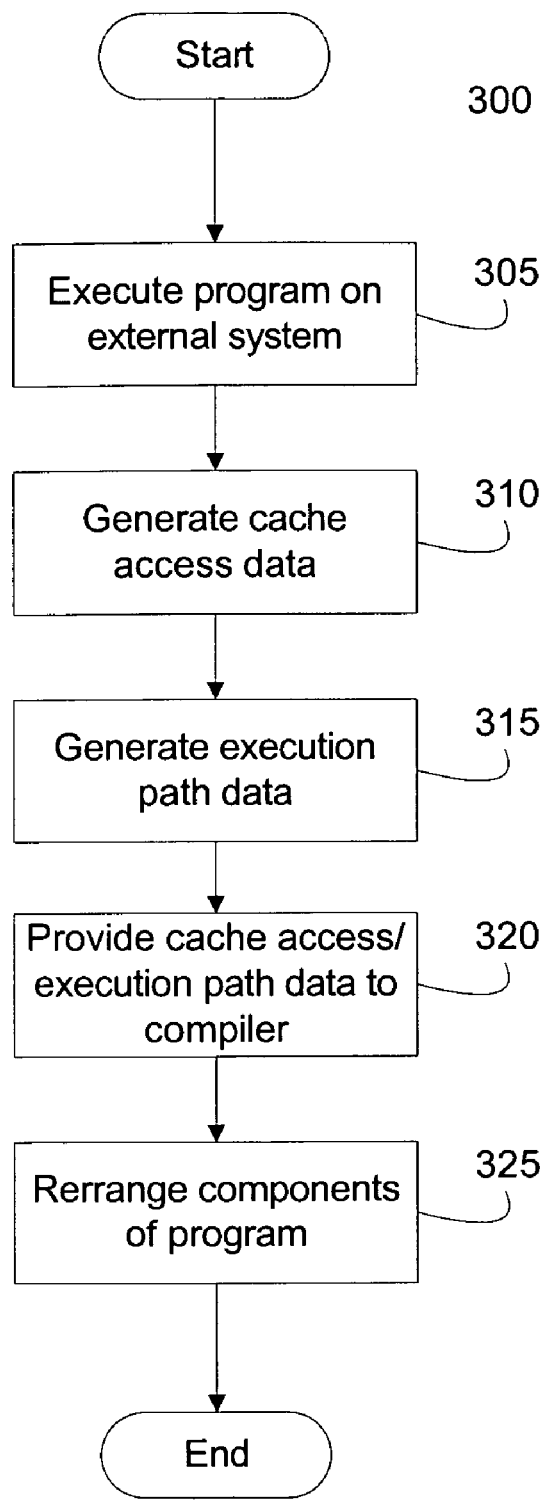
FIG. 3 shows an exemplary embodiment of a method for optimizing code performance based on cache analysis according to the present invention.

FIG. 3 shows an exemplary embodiment of a method 300 for optimizing code performance based on cache analysis according to the present invention. In step 305, the program 200, arranged in the first code layout 205, is loaded onto and executed by the external system. As explained above, the external system may be a conventional hardware/software emulator or simulator which includes modules corresponding to an emulated computer's subsystems. For example, the external system may include a CPU emulator and a memory subsystem module comprising an emulated main memory and an emulated cache memory. According to the exemplary embodiments of the present invention, the external system may further include an instruction set simulator which counts a number of times a particular path in the program is executed and the corresponding cache lines hit for the path.

In step 310, the cache access data is generated based on the execution of the program 200 on the external system. Generation of the histogram for the emulated cache memory may represent cache usage parameters, e.g., hits, misses, collisions, contention, etc. The cache access data may further include a processing time for each portion of code within the program and/or where the CPU emulator is at in the code at predefined or subjective intervals. Similarly, in step 315, the execution path data is generated based on the execution of the program 200 on the external system. Those skilled in the art will understand that the cache access data and the execution path data may both be used during the optimization process and or either of these pieces of data may be used exclusively during optimization. That is, a developer may decide to only use execution path data to optimize a program, while a different developer may decide to use both the cache access data and the execution path data. Also, while the exemplary embodiments describe automated collection of the cache access data, a programmer may manually review the program 200 to determine (and flag) which portions of the code (routines) should be included in the cache memory 20. For example, the external system may not be able to understand which routines are critical in the execution path if these routines are not flagged in some manner by the developer.

In step 320, the cache access and/or execution path data is inputted to a compiler for re-compiling the program 200. In this step, the program 200 may be recompiled on the external system for further analysis or compiled by the processor 10 for its intended use. The compiler may operate as conventionally known until a linker combines object modules to form the executable program. As known by those skilled in the art, the linker arranges the object modules in a program's address space which may include relocating code which assumes a specific base address to another base. Since the compiler seldom knows where a particular object module will reside, it often assumes a fixed base location (e.g., 0). Relocating may involve re-targeting of absolute jumps, loads and stores.

In step 325, the linker utilizes the cache access/execution path data to generate the second code layout 210 so that, upon execution of the program 200, the most frequently utilized routines/paths are inserted into the cache memory 20 to reduce cache collisions and cache-line contention. It should be noted that the loader on the target device may also rearrange the code as it is loaded. That is, the loader on the target device may rearrange the code based on the externally defined (or determined data). Alternatively, the target loader may also perform some of the analysis and use both the externally generated data and internally generated data to perform the loading.

Those skilled in the art will understand that the method 300 may be performed iteratively (i.e., closed loop) on the program 200 to ensure that a resulting code layout is optimal. For example, an optimal cache usage profile (e.g., an optimal histogram) may be stored and used as a comparison for the second code layout 210. The processor 10 may compare the cache usage histogram for the second code layout 210 to the optimal histogram to determine whether further cache access data should be collected. Any subsequent code layout generated may be compared with the optimal histogram as is done in conventional closed loop systems.

It will be apparent to those skilled in the art that various modifications may be made in the present invention, without departing from the spirit or the scope of the invention. Thus, it is intended that the present invention cover modifications and variations of this invention provided they come within the scope of the appended claims and their equivalents.

What is claimed is:

1. A system including a memory to store a set of instructions executable by a processor, the set of instructions being operable to:

compile and execute a program having a first layout of source code routines;

generate at least one memory access parameter for the program, the memory access parameter being based on a cache memory of a computing system on which the program is designed to run, the at least one memory access parameter including at least one of execution frequency data and execution criticality data; and recompile and execute the program having a second layout of source code routines, wherein the at least one memory access parameter is used by a linker to construct the second layout for the program based on at least one of the execution frequency data and the execution criticality data, and wherein a loader rearranges the second layout of the source code routines based on the at least one of the execution frequency data and the execution criticality data to perform loading.

2. The system according to claim 1, wherein the at least one memory access parameter is one of cache access data and execution path data.

3. The system according to claim 1, wherein each of the first and second layouts are one of a code layout and a data layout.

4. The system according to claim 1, wherein the generating the at least one memory access parameter includes:
analyzing accesses to the cache memory.

5. The system according to claim 1, wherein the method is performed on a second computing system.

6. The system according to claim 5, wherein the second computing system is a hardware simulator with instruction execution capabilities.

7. The system according to claim 6, further comprising:
identifying cache lines hit for the preselected path.

8. The system according to claim 1, wherein the generating the at least one memory access parameter includes:
counting a number of times a preselected path in the program is executed.

9. The system according to claim 1, wherein the at least one memory access parameter includes at least one of (i) cache hits, (ii) cache misses, (iii) cache collisions, (iv) contention for a predetermined cache line, (v) a processing time for a predetermined portion of the program (vi) a location in the program of a processor at a predetermined interval and (vii) a manually tagged portion of the program.

10. The system according to claim 1, further comprising:
generating at least one further memory access parameter for the program in the second layout; and
comparing the at least one further memory access parameter to an optimal cache usage profile to determine whether further cache data should be collected.

11. A system, comprising:
a memory to store a program; and
a processor including:
a hardware simulator component to compile and execute the program having a first layout of source code routines, the hardware simulator component generating at least one memory access parameter for the program, the memory access parameter being based on a cache memory of a computing system on which the program is designed to run, the at least one memory access parameter including at least one of execution frequency data and execution criticality data;
a linker component to construct a second layout of source code routines for the program based on at least one of the execution frequency data and the execution criticality data, wherein the hardware simulator component recompiles and executes the program having the second layout of source code; and
a loader rearranges the second layout of the source code routines based on the at least one of the execution frequency data and the execution criticality data to perform loading.

12. The system according to claim 11, wherein the hardware simulator component analyzes accesses to the cache memory as the program is executing.

13. The system according to claim 11, wherein the hardware simulator component counts a number of times a preselected path in the program is executed.

14. The system according to claim 13, wherein the hardware simulator component identifies cache lines hit for the preselected path.

15. The system according to claim 11, wherein the at least one memory access parameter includes at least one of (i) cache hits, (ii) cache misses, (iii) cache collisions, (iv) contention for a predetermined cache line, (v) a processing time for a predetermined portion of the program (vi) a location in the program of a processor at a predetermined interval and (vii) a manually tagged portion of the program.

16. The system according to claim 11, wherein the hardware simulator component generates at least one further memory access parameter for the program in the second layout and compares the at least one further memory access parameter to an optimal cache usage profile.

17. The system according to claim 16, wherein the comparison to the optimal cache usage profile determines whether further cache data should be collected.

18. The system according to claim 11, wherein the computing system on which the program is designed to run includes the cache memory and a main memory, wherein the second code layout has less cache line contentions than the first code layout.

19. The system according to claim 11, wherein the computing system on which the program is designed to run includes the cache memory and a main memory, wherein the second code layout has less cache collisions than the first code layout.

* * * * *